US012693045B2

(12) United States Patent
Maccari et al.

(10) Patent No.: US 12,693,045 B2
(45) Date of Patent: Jul. 28, 2026

(54) DEVICE AND SYSTEM FOR MONITORING THE CONDITIONS OF A THERMAL FLUID, AND METHOD FOR SAID MONITORING

(71) Applicant: RIOGLASS SOLAR SCH, S.L., Aznalcollar (ES)

(72) Inventors: Augusto Maccari, Aznalcollar (ES); Evaristo Manuel Esquinas Navas, Aznalcollar (ES); Ana Isabel Morales García, Aznalcollar (ES); Juan Pablo Núñez, Seville (ES); Álvaro Muñoz, Seville (ES)

(73) Assignee: RIOGLASS SOLAR SCH, S.L., Aznalcollar (ES)

( * ) Notice: Subject to any disclaimer, the term of this patent is extended or adjusted under 35 U.S.C. 154(b) by 275 days.

(21) Appl. No.: 18/691,467

(22) PCT Filed: Sep. 12, 2022

(86) PCT No.: PCT/EP2022/075306
§ 371 (c)(1),
(2) Date: Mar. 13, 2024

(87) PCT Pub. No.: WO2023/036987
PCT Pub. Date: Mar. 16, 2023

(65) Prior Publication Data
US 2025/0129972 A1     Apr. 24, 2025

(30) Foreign Application Priority Data
Sep. 13, 2021     (EP) ..................................... 21382821

(51) Int. Cl.
F24S 40/00          (2018.01)
F16L 9/18          (2006.01)
(Continued)

(52) U.S. Cl.
CPC ............... F24S 40/00 (2018.05); F24S 10/70 (2018.05); F24S 40/90 (2018.05); F16L 9/18 (2013.01); G01N 7/10 (2013.01)

(58) Field of Classification Search
CPC .. F24S 40/00; F24S 40/90; F24S 40/46; F24S 10/80; G01N 7/10; F16L 9/18
See application file for complete search history.

(56) References Cited

U.S. PATENT DOCUMENTS 4,708,124 A * 11/1987 Dorbeck .................. F24S 23/74
                                                         126/684
4,886,048 A    12/1989 Labaton et al.
                    (Continued)

FOREIGN PATENT DOCUMENTS

CN        211695450 U     10/2020
EP          0909951 B1 *  2/2001 ........... G01N 33/005
WO      2010128135 A2     11/2010

OTHER PUBLICATIONS

Cachafeiro, H., et al. "Analysis of vacuum evolution inside Solar Receiver Tubes." Energy Procedia 69 (2015): 289-298.*
(Continued)

*Primary Examiner* — Herbert K Roberts
(74) *Attorney, Agent, or Firm* — S.J. INTELLECTUAL PROPERTY LTD.

(57)          ABSTRACT
The present invention relates to a device and system for monitoring the conditions of a thermal fluid in a solar power plant. Likewise, the invention relates to the solar power plant using the monitoring system and to a method for installing the device for monitoring the conditions of the thermal fluid in a solar power plant. The device allows monitoring the conditions of the thermal fluid by means of an adaptation, i.e., by means of making a cut on an existing thermal fluid transporting tube of a solar power plant or by
(Continued)

means of installing a two-section outer tube on the same existing tube without modifying the existing circuit.

20 Claims, 5 Drawing Sheets

(51) Int. Cl.

| | |
|---|---|
| *F24S 10/70* | (2018.01) |
| *F24S 40/90* | (2018.01) |
| *G01N 7/10* | (2006.01) |

(56) References Cited

U.S. PATENT DOCUMENTS

| | | | | |
|---|---|---|---|---|
| 5,279,169 | A * | 1/1994 | Freeman | G01N 17/00 |
| | | | | 73/866 |
| 6,171,025 | B1 * | 1/2001 | Langner | G01M 3/283 |
| | | | | 73/40.7 |
| 10,646,821 | B2 | 5/2020 | Glatzmaier | |
| 11,105,729 | B2 * | 8/2021 | Kittel | G01N 33/2025 |
| 2006/0213566 | A1 * | 9/2006 | Johnson | F16L 59/143 |
| | | | | 138/111 |
| 2012/0042651 | A1 * | 2/2012 | Barkai | F03G 6/121 |
| | | | | 126/654 |
| 2017/0219251 | A1 * | 8/2017 | Kuckelkorn | F24S 40/46 |
| 2018/0099246 | A1 * | 4/2018 | Glatzmaier | B01D 53/326 |
| 2020/0188901 | A1 * | 6/2020 | Kittel | G01N 17/006 |

OTHER PUBLICATIONS

Jung, Christian, et al. "Hydrogen monitoring in the heat transfer fluid of parabolic trough plants." AIP Conference Proceedings. vol. 2126. No. 1. AIP Publishing LLC, 2019.*

* cited by examiner

DEVICE AND SYSTEM FOR MONITORING THE CONDITIONS OF A THERMAL FLUID, AND METHOD FOR SAID MONITORING

OBJECT OF THE INVENTION

The present invention relates to a device and system for monitoring the conditions of a thermal fluid in a solar power plant. Likewise, the invention relates to the solar power plant using said monitoring system and to a method for installing the device for monitoring the conditions of the thermal fluid in a solar power plant. The device allows monitoring the conditions of the thermal fluid by means of an adaptation, i.e., by means of making a cut on an existing thermal fluid transporting tube of a solar power plant or by means of installing a two-section outer tube on the same existing tube without modifying the existing circuit.

BACKGROUND OF THE INVENTION

Solar power collectors are normally used in solar fields where solar energy is to be captured for use in electrical power generation. A widely used type of these solar power collectors are concentrated solar power (CSP) parabolic trough collectors for receiving solar radiation with a high output.

A solar field is known to occupy a large surface area made up of a plurality of rings of solar power collectors, also called loops. Independent, serially assembled collector modules, which are capable of rotating throughout the day in order to attain the most perpendicular incidence possible, and therefore to capture the highest amount of solar energy at any time of the day, are grouped in each loop of a solar field. Furthermore, a loop is known as the minimal productive unit of a solar field.

A solar collector is made up of reflective mirrors which are capable of reflecting incident solar radiation towards a line corresponding to the focal point of the parabola formed by the curvature of the mirrors. There is located in said line corresponding to the focal point of the parabola a pipe made up of a series of solar receivers (receiver or absorber tubes) which convert solar radiation into thermal energy, in which a heat transfer fluid running across the entire surface of a solar field is transported. Said fluid heats up and has the function of transporting said captured solar energy through a circuit.

Furthermore, connecting pipes are also provided between loops, connecting a first series of collectors in one loop with a second series of collectors. These connecting or intersecting pipes are known as "crossovers".

Normally, the heat transfer fluid, also called HTF, transported in each point of the piping of a solar field is usually made up of a eutectic mixture comprising 26.5% diphenyl oxide and 73.5% biphenyl. Said mixture is known to exhibit a good compromise between heat transport output, cost, and performance, although it presents complexities for handling under the conditions of use because it influences, and conditions in a very significant manner, the solar power plant exploitation results.

At the end of its path, the HTF is introduced into a steam generation train where it is transferred to a circuit of water previously pressurized in a centrifugal pump, eventually generating steam. The generated steam is then introduced in a steam turbine in which the pressure of the steam generates rotary mechanical energy, and ultimately electrical power through a generator.

In particular, the receiver tube mainly comprises a steel absorber tube, a protective glass cover, a vacuum chamber between the steel tube and the cover, and two compensators. In the event of a malfunction of the receiver tubes, the capture of solar energy and the overall efficiency of the solar field may drop significantly. To counteract said phenomenon, it is crucial to ensure that the vacuum chamber maintains the suitable pressure level such that the molecular transport properties are maintained, and therefore to obtain maximum capture of solar radiation concentrated by part of the steel absorber tube.

If the vacuum level is not optimal or diminishes, heat losses due to conduction increase exponentially, and it therefore ends up degrading the receiver tube and reducing its efficiency drastically.

There are many factors which may lead to a vacuum loss in absorber tubes:

The entry of oxygen into the vacuum chamber as a result of one of the components of the absorber tube breaking or cracking.

The entry of hydrogen into the vacuum chamber. Given that the absorber tube is permeable to hydrogen, if the HTF undergoes degradation and therefore produces hydrogen, this hydrogen can permeate the absorber tube and invade the vacuum chamber.

In the technical field of measuring hydrogen in HTF tubes of solar power plants, selective hydrogen transport and measurement systems and methods based particularly on the use of hydrogen-permeable membranes are known. Moreover, some existing preventive methods consist of applying a specific coating on the steel absorber tube to reduce hydrogen permeability. The installation of "fake" tubes acting as measuring tubes, replacing an absorber tube segment in each loop of the solar power plant, is also known.

The use of hydrogen absorption devices, called "getters", for the purpose of absorbing the hydrogen infiltrating the vacuum chamber formed between the steel tube and the glass cover, is also known. However, these devices ("getters") present limitations in terms of the total volume of hydrogen they can absorb, so when these devices reach their hydrogen absorption capacity limit, said hydrogen starts to build up in the vacuum chamber.

There is therefore a need for a reliable device for measuring hydrogen in HTF pipes which, at the same time, does not affect solar field output. Furthermore, ideally, said device should be able to be installed in a loop of a solar power field without having to sacrifice a functional receiver tube. Likewise, there is a need to have a real-time, continuous measuring device which allows an operator to make decisions or establish operation and maintenance strategies based on these continuous responses of the device.

Document US 2012/0042651 A1 relates to solar thermal power plants, and in particular to arrangements for removing dissociated hydrogen therefrom.

DESCRIPTION OF THE INVENTION

The present invention proposes a solution to the preceding problems by means of a device for monitoring the conditions of a thermal fluid according to claim 1, a system for monitoring the conditions of a thermal fluid according to claim 13, a solar power plant comprising the system for monitoring the conditions of a thermal fluid according to claim 16, and a method for installing a device for monitoring the conditions of a thermal fluid according to claim 19. The dependent claims define preferred embodiments of the invention.

A first inventive aspect provides a device for monitoring the conditions of a thermal fluid comprising:

an inner tube with a length $L_1$ and an outer diameter $D_1$, and an outer tube with a length $L_2$, wherein the outer tube comprises a central portion with an inner diameter $D_2$ and ends the inner diameter of which $D_i$ gradually decreases towards the narrowest part thereof having a diameter $D_e$, wherein the inner diameter $D_e$ is smaller than the inner diameter $D_2$, wherein the inner tube is arranged coaxially inside the outer tube, the length $L_1$ of the inner tube is greater than the length $L_2$ of the outer tube, and the inner diameter $D_e$ substantially coincides with the outer diameter $D_1$, such that a substantially airtight chamber is formed between the outer tube and the inner tube, wherein the device comprises connection means located on the outside of the outer tube, the connection means being configured for establishing a fluidic communication with the substantially airtight chamber and for coupling a vacuum pump, wherein the inner tube is configured for transporting a thermal fluid, and the outer tube is made of metal.

For the main purpose of maintaining the highest possible output of a solar power plant, it is essential to monitor the thermal fluid conditions to prolong the service life of the circuit of said solar power plant and perform intervention through corrective maintenance actions as soon as possible.

Throughout the document, thermal fluid is understood to be any thermal fluid that can be used in a circuit of pipes or conduits in a solar power plant such as a fluid capable of absorbing thermal energy and subsequently transferring same to other media. Preferably, the thermal fluid is a heat transfer fluid, or HTF, transported in each point of a circuit of a solar power plant.

Throughout the document, a substantially airtight chamber is understood to be a chamber formed between an inner tube and an outer tube, wherein the inner tube is permeable to gas, preferably hydrogen, and wherein the outer tube ensures the airtightness of the chamber such that gas exchange occurs only from the inner tube to the inside of the substantially airtight chamber. Additionally, before installing and starting up the device, a prior scanning of the substantially airtight chamber is performed, and this allows the presence of gas, preferably hydrogen, to be optimally monitored and the origin of said gas verified.

As a result of the device of the first inventive aspect of the invention, an outer tube is arranged on an existing inner tube of the circuit, forming a substantially airtight chamber between the outer tube and the inner tube. Both tubes are arranged coaxially to obtain a homogeneous measurement inside the substantially airtight chamber. Furthermore, the length $L_2$ of the outer tube is smaller than the length $L_1$ of the inner tube in order to form a substantially airtight chamber having a small size relative to the size of the entire circuit. Hydrogen originating from the permeation taking place in the inner tube can thereby be enclosed in the substantially airtight chamber so as to therefore enable evaluating, among others, pressure variation in said chamber.

The diameter $D_2$ of the central portion of the outer tube gradually decreases at the ends thereof and said ends have a diameter $D_1$ which decreases until reaching the narrowest diameter, i.e., diameter $D_e$, at both terminals of the outer tube. Therefore, $D_i$ is comprised within the interval $[D_2; D_e]$.

In particular, the diameter $D_e$ substantially coincides with the outer diameter $D_1$ of the inner tube. Advantageously, diameters $D_e$ and $D_1$ that substantially coincide with one another allow the formation of the substantially airtight chamber presenting optimal airtightness conditions for thermal fluid monitoring.

Even more advantageously, since diameters $D_e$ and $D_1$ substantially coincide with one another, the device allows choosing the optimal type of attachment between the outer tube and the inner tube that would allow forming the substantially airtight chamber in the optimal conditions thereof. Preferably, the attachment between the inner tube and the outer tube is made by means of welding the ends of the outer tube.

Additionally, the outer tube has connection means configured for establishing a fluidic communication with the inside of the substantially airtight chamber. Preferably, the connection means are a normally closed valve, which allows coupling a vacuum pump and is welded to the outer part of the outer tube.

In a particular example, the substantially airtight chamber is scanned as a result of the vacuum pump coupled to the connection means after the installation of the device of the first inventive aspect.

Advantageously, emptying the substantially airtight chamber of all the gases after the installation of the device of the first inventive aspect allows the measurement of the amount of gas, preferably hydrogen, that may leak from the wall of the inner tube to the substantially airtight chamber, to be ensured.

Furthermore, the outer tube of the device of the first inventive aspect of the invention is made of metal and allows the monitoring time to be reduced since the volume of the substantially airtight chamber is smaller than a chamber potentially formed by a glass outer tube belonging to a conventional absorber tube.

Advantageously, the metal outer tube facilitates the attachment with the inner tube, preferably by means of welding. Said inner tube is preferably made of metal and has an expansion coefficient substantially equal to the expansion coefficient of the outer tube. Lastly, using a metal outer tube provides a device that is overall more robust than a device the outer tube of which is made of glass.

Advantageously, the device of the first inventive aspect of the invention allows monitoring the evolution of the presence of gas, preferably hydrogen, inside the substantially airtight chamber and calculating the amount of said gas by extrapolating pressure to the amount of gas in moles.

Likewise, the device allows a quick, effective, and precise monitoring of the conditions of the thermal fluid as a result of the substantially airtight chamber. Furthermore, by directly measuring the pressure in the substantially airtight chamber and performing the subsequent pressure extrapolation calculations, a real-time status of the state of the solar power field is obtained.

In a particular embodiment, the substantially airtight chamber has a volume $V_c$ and a length $L_c$, and the ratio between the volume $V_c$ and the length $L_c$ is less than 3.5 L/m.

Throughout the document, the volume $V_c$ of the substantially airtight chamber is defined by the height of said chamber, i.e., the distance between the outer wall of the inner tube and the inner wall of the outer tube of each central portion of the tubes, and by the length $L_c$. In a particular embodiment, the length $L_c$ is substantially equal to the length $L_2$ between the two ends of the outer tube.

Advantageously, when the ratio between the volume $V_c$ and the length $L_c$ is less than 3.5 L/m, an optimal measurement and monitoring of both the conditions of the thermal fluid and of the airtight chamber is ensured, and it therefore allows obtaining a precise measurement and monitoring and with an optimal response time.

In a particular embodiment, the inner tube has an area $A_i$ and the ratio between the volume $V_c$ of the substantially airtight chamber and the area $A_i$ of the inner tube is less than 15 L/m².

Area of the inner tube is understood to be the outer surface of the inner tube covered by the outer tube, which defines the base of the substantially airtight chamber. Said surface depends on the perimeter of a vertical section of the inner tube and on the length $L_c$.

Advantageously, monitoring of the conditions of the thermal fluid is performed under nominal pressure and temperature conditions along the pipe and where the ratio between the volume of the vacuum chamber and permeability is less than $3 \times 10^8$ l·s/mol. Furthermore, by having a ratio between the volume of the substantially airtight chamber and the area of the inner tube of less than 15 L/m² and a ratio between the volume of the vacuum chamber and permeability of less than $3 \times 10^8$ l·s/mol, the monitoring device is capable of ensuring an optimal response time when it comes to detecting variations in the pressure of the gas, preferably hydrogen, inside the substantially airtight chamber.

In a particular embodiment, the thickness of the outer tube is greater than the thickness of the inner tube.

Advantageously, the thickness of the outer tube is greater than the thickness of the inner tube in order to ensure the optimal airtightness of the substantially airtight chamber in the part corresponding to the outer tube.

In a particular embodiment, the outer tube has a hydrogen permeability coefficient less than the permeability coefficient of the inner tube.

In a preferred example, the device allows monitoring the presence of hydrogen as a result of the degeneration of the thermal fluid or HTF transported inside the inner tube over time.

Advantageously, the outer tube has a hydrogen permeability coefficient less than the hydrogen permeability coefficient of the inner tube such that the outer tube ensures the proper maintenance of the hydrogen originating from the inner tube.

In a particular embodiment, the outer tube is made of steel.

In a particular embodiment, the outer tube is made of austenitic stainless steel.

In a particular example, the outer tube is made of AISI 303, AISI 304/304L, AISI 310, AISI 316/316L, AISI 317/317L, AISI 321, AISI 347, 17-4 PHP, or XM-19 (Nit. 50) austenitic stainless steel.

In a particular embodiment, the ends are tapered.

Advantageously, the ends are tapered and allow both ends of the outer tube to have a linear diameter reduction, decreasing from diameter $D_2$ of the central portion of the outer tube until the inner diameter $D_e$ of each end substantially coincides with the outer diameter $D_1$.

In a particular example, the tapered ends allow the device for monitoring the thermal fluid of the first inventive aspect to be installed in a quick and efficient manner and the outer tube acts like a customized sheath of the inner tube. Likewise, the tapered ends facilitate the coaxial installation of the two tubes.

In a particular embodiment, the outer tube comprises a coating to reduce the passage of hydrogen out of the substantially airtight chamber.

Advantageously, the coating of the outer tube allows achieving a greater precision in measuring the hydrogen inside the substantially airtight chamber, and therefore improving the detection and the response time of the device of the invention.

In a particular embodiment, the outer tube comprises a first independent section and a second independent section.

In a particular example, the device comprises a first section and a second section which allow said device to be installed on an already existing tube of an HTF transporting circuit of a solar power plant. The existing tube therefore acts as the inner tube of the device on which the outer tube is coaxially arranged and where the substantially airtight chamber is formed.

Preferably, the two sections are two parts of a tube horizontally sectioned with respect to its cylindrical shape, preferably, two substantially equal semi-cylindrical sections.

Advantageously, by comprising two sections, the device can be installed without cutting, damaging, or altering the existing circuit.

In a particular embodiment, the first section and the second section of the outer tube are welded to one another and to the inner tube, thereby forming the substantially airtight chamber.

Advantageously, the first section and the second section are welded to one another and to the inner tube such that the substantially airtight chamber, and particularly the outer tube, present optimal airtightness conditions. Particularly and preferably, the first section and the second section are welded, forming the substantially airtight chamber and therefore allowing hydrogen to be retained inside said substantially airtight chamber.

In a particular embodiment, the first section and the second section of the outer tube comprise fixing means for forming the substantially airtight chamber.

In a preferred embodiment, the first section has projections, or male fixing means, along its selected portions. Likewise, the second section has holes, or female fixing means, along its selected portions. Furthermore, the projections of the first section and the holes of the second section correspond to one another such that the two sections can be coupled together.

Advantageously, the fixing means allow consolidating the assembly of the first section with the second section and keeping the two sections together until the fixed attachment thereof, preferably by means of welding, is performed.

In a second inventive aspect, the invention provides a system for monitoring the conditions of a thermal fluid comprising:
  a device for monitoring the conditions of a thermal fluid according to the first inventive aspect, and
  equipment comprising:
    gas distribution means fluidically coupled to the connection means,
    pressure measuring means fluidically coupled to the gas distribution means,
    temperature measuring means connected to the inner tube,
    opening and closing means fluidically coupled to the gas distribution means,
    information processing means, and
    communication means,

7 wherein the pressure measuring means are configured for measuring the pressure inside the substantially airtight chamber, the temperature measuring means are configured for measuring the temperature of the inner tube, the opening and closing means are configured for opening or closing the system, the gas distribution means are configured for transporting the gas contained in the substantially airtight chamber to the pressure measuring means and the opening and closing means, the information processing means are configured for controlling the pressure measuring means and the temperature measuring means, and the communication means are configured for receiving information from the pressure measuring means and the temperature measuring means, as well as for transmitting same.

All the advantages described for the device for monitoring the conditions of a thermal fluid throughout the description apply, with the corresponding changes, to the system for monitoring the conditions of a thermal fluid using the device.

In a particular example, the gas distribution means are coupled to the connection means of the device for monitoring the conditions of a thermal fluid. Preferably, the gas distribution means are a central part which is in fluidic connection with the substantially airtight chamber and through which a sample of the contents of said substantially airtight chamber is monitored.

In a preferred embodiment, the pressure measuring means allow measuring the pressure inside the substantially airtight chamber through the sample distributed by the gas distribution means. In a more preferred example, the pressure of the hydrogen present inside the substantially airtight chamber is measured and the pressure is extrapolated to the amount of hydrogen in moles.

In one and the same preferred embodiment, the temperature measuring means allow the temperature of the inner tube to be measured in real time and at all times during the monitoring of the conditions of the thermal fluid. Preferably, the opening and closing means are a normally closed valve.

In one and the same preferred embodiment, the information processing means and the communication means allow the values measured by both the pressure measuring means and the temperature measuring means to be received in real time. Furthermore, the control of those same measuring means is performed through an external data acquisition box which allows collecting data and actuating the information processing means and the communication means manually "in situ" and remotely.

In a particular example, pressure variation inside the substantially airtight chamber is measured in real time and the pressure measurement is sent to the information processing means through the communication means. Furthermore, calculations are performed in additional means as a result of an algorithm for predicting the final stagnation value of the substantially airtight chamber. Advantageously, said algorithm allows predicting the final stagnation value in an interval of 3 to 7 days instead of waiting for the system to reach said final stagnation value, usually in an interval of 20 to 30 days.

Advantageously, data collection and storage are performed for a number of days allowing a stagnation value of the pressure, in moles of hydrogen, inside the substantially airtight chamber to be reached and precisely predicted. Preferably, data collection and storage are performed for 3-7 days.

Advantageously, the device allows measuring minimum and maximum pressure variations of the hydrogen present inside the substantially airtight chamber and also allows extrapolating same to the predicted pressure variations of the thermal fluid transported inside the inner tube.

In a particular embodiment, the system further comprises a vacuum pump configured for generating a vacuum inside the substantially airtight chamber.

In a particular example, the vacuum pump is coupled to an inlet of the gas distribution means.

Advantageously, the vacuum pump allows generating a vacuum inside the substantially airtight chamber after the installation of the device and such that only hydrogen originating from the inner tube can penetrate said substantially airtight chamber through the permeable wall of the inner tube.

In a particular embodiment, the device of the system is configured for being installed in at least one segment of a solar power plant.

In a particular example, a device for monitoring the thermal fluid transported through the inner tube is installed in different loops of a solar power plant.

Advantageously, by installing a device in different loops of a solar power plant, an optimal and more complete real-time monitoring of the entire solar power plant is allowed.

In an even more particular example, a device for monitoring the thermal fluid transported through the inner tube is installed in all the loops of a solar power plant.

Advantageously, by installing a device in all the loops of a solar power plant, an even more optimal and more complete real-time monitoring of the entire solar power plant is allowed In a third inventive aspect, the invention provides a solar power plant comprising a system of the second inventive aspect, wherein the system is located in at least one loop of solar power collectors.

All the advantages described for the device and the system for monitoring the conditions of a thermal fluid throughout the description apply, with the corresponding changes, to the solar power plant using the device.

In a particular embodiment, the device for monitoring the conditions of a thermal fluid is located in a region without concentrated radiation.

Region without concentrated radiation is understood to be a region in which the device does not receive concentrated solar radiation originating from the reflection of reflective mirrors, i.e., a region in which the thermal fluid transported in the inner tube is not heated by concentrated solar radiation.

Advantageously, installing the device for monitoring the conditions of a thermal fluid in a region without concentrated radiation allows preventing the deterioration of the device once it is installed and ensuring a long service life. Furthermore, by being installed in a region without concentrated radiation, the device does not cause the plant to lose efficiency.

In a particular embodiment, the device is located in the crossover region of at least one loop of solar power collectors.

In a particular example, the crossover region is the region of each loop in which the inner tube exhibits a 180° turn in order to return to the central segment of a solar power plant. Furthermore, the crossover region is a region without concentrated radiation in which the installation of the device of the first inventive aspect is facilitated and in which parameters are kept more stable for the precise measurement of the pressure of the hydrogen inside the substantially airtight chamber.

In a fourth inventive aspect, the invention provides a method for installing a device for monitoring the conditions of a thermal fluid, characterized in that it comprises the steps of:

(a) providing the first and second sections of a device for monitoring the conditions of a thermal fluid according to any of the embodiments of the first inventive aspect of the invention, wherein the outer tube has a first section and a second section, (b) welding the first section and the second section of the outer tube of the device provided in step (a) in a region without concentrated radiation on an existing tube of at least one loop of solar power collectors.

All the advantages described for the device, the system for monitoring the conditions of a thermal fluid and the solar power plant throughout the description apply, with the corresponding changes, to the method for installing the monitoring device.

In a particular example, once the device is installed on the existing tube of at least one loop of solar power collectors, the existing tube acts as the inner tube of the device described above in the present document.

Advantageously, the method for installation in which the device of the first inventive aspect has a first section and a second section allows facilitating said installation given that the tube of the existing circuit does not have to be cut or altered in order to position the monitoring device.

In another particular example, the first section and the second section of the outer tube are welded in both parts of their respective parts and at their ends.

Additionally, the outer tube formed by the two welded sections presents all the technical features of the outer tube described throughout the present document, such as its length, its inner diameter $D_2$, the variable inner diameter of its ends $D_1$, the diameter of its narrowest part $D_e$, etc.

In another more particular example, after having installed and welded the two sections of the outer tube and the ends of the outer tube to the inner tube, a leak test is performed on the device and a vacuum is finally generated inside the substantially airtight chamber.

Advantageously, that method facilitates installation, reduces installation costs, and ensures a quick installation of the device for monitoring the conditions of the thermal fluid transported through the inner tube.

In a particular embodiment, the method for installing a device for monitoring the conditions of a thermal fluid is characterized in that it comprises the steps of:

(a) providing a device for monitoring the conditions of a thermal fluid according to any of the embodiments of the first inventive aspect of the invention, wherein the outer tube is a single tube, (b) cutting a part of a tube from at least one loop of solar power collectors in a region without concentrated radiation, and (c) welding the two ends of the outer tube of the device in the part cut from the loop in step (b).

In a particular embodiment, the device is located in the crossover region of at least one loop of solar power collectors.

All the features and/or steps of the methods described in this specification (including the claims, description, and drawings) can be combined in any combination, with the exception of combinations of such mutually exclusive features.

DESCRIPTION OF THE DRAWINGS

These and other features and advantages of the invention will become more apparent from the following detailed description of a preferred embodiment given solely by way of non-limiting illustrative example in reference to the attached figures.

DETAILED DISCLOSURE OF THE INVENTION

Figure 1:
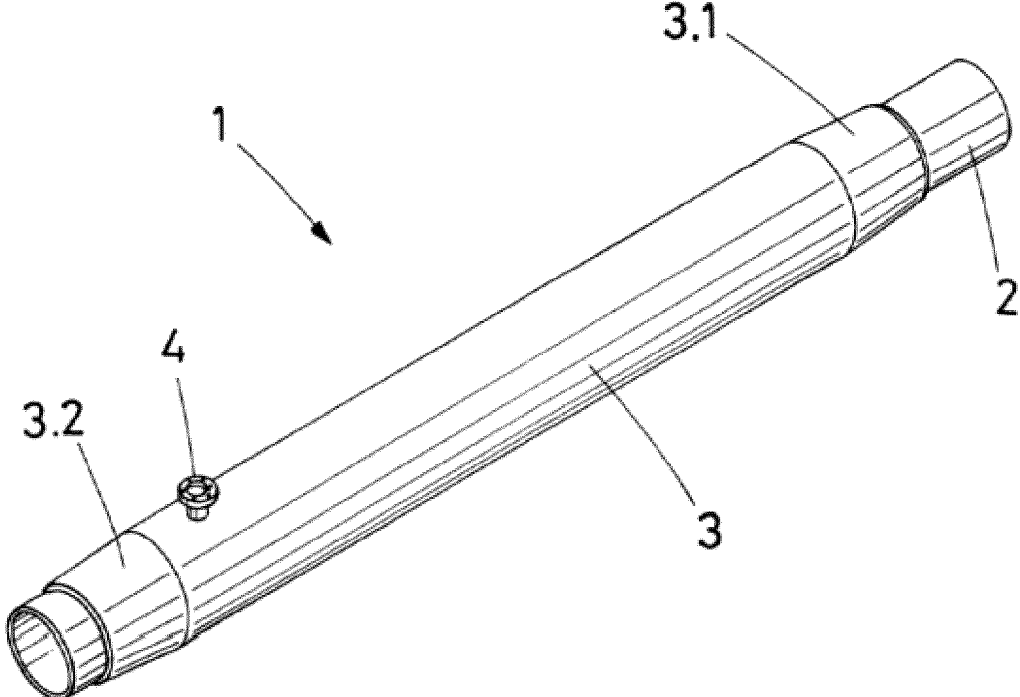
FIG. 1 shows a first embodiment of the device for monitoring the conditions of a thermal fluid.

FIG. 1 shows an embodiment of the device (1) for monitoring the conditions of a thermal fluid. It can be seen that the device (1) comprises an inner tube (2) and an outer tube (3), wherein the outer tube (3) is made of metal. Furthermore, the inner tube (2) is arranged coaxially inside the outer tube (3) and said outer tube (3) has two ends (3.1, 3.2).

Preferably, the ends (3.1, 3.2) are tapered.

In a preferred example, the ends (3.1. 3.2) are welded to the inner tube (2).

In another preferred example, the outer tube (3) is made of steel. In a more preferred embodiment, the outer tube (3) is made of austenitic stainless steel.

Preferably, the outer tube (3) is made of AISI 303, AISI 304/304L, AISI 310, AISI 316/316L, AISI 317/317L, AISI 321, AISI 347, 17-4 PH®, or XM-19 (Nit. 50) austenitic stainless steel.

Furthermore, FIG. 1 shows connection means (4) configured for establishing a fluidic communication with a substantially airtight chamber (not depicted) and for coupling a vacuum pump (not depicted).

Preferably, a vacuum pump is coupled to the device (1) after said device (1) has been installed and a vacuum generated inside the substantially airtight chamber formed between the inner tube (2) and the outer tube (3).

In a preferred example, the outer tube (3) has a hydrogen permeability coefficient less than the permeability coefficient of the inner tube (2).

Preferably, the outer tube (3) comprises a coating to reduce the passage of hydrogen out of the substantially airtight chamber.

Figure 2:
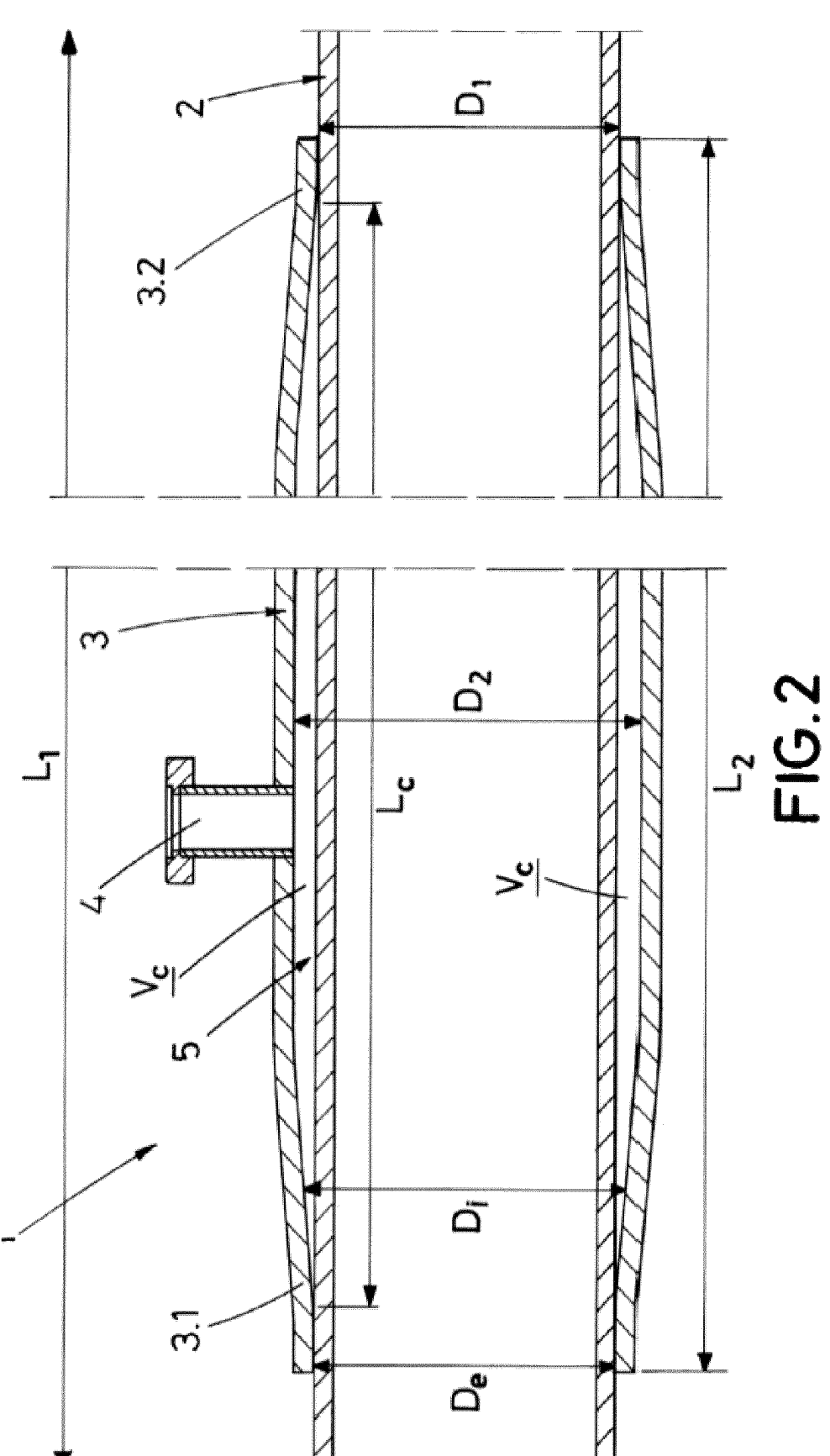
FIG. 2 shows a section view of the same first embodiment of the device for monitoring the conditions of a thermal fluid, in which the formation of a substantially airtight chamber can be contemplated.

FIG. 2 shows a section view of the same first embodiment of the device (1) for monitoring the conditions of a thermal fluid in which the formation of the substantially airtight chamber (5) between the inner tube (2) and the outer tube (3) can be contemplated.

On one hand, the inner tube (2) has a length $L_1$ and an outer diameter $D_1$. On the other hand, the outer tube (3) has a length $L_2$ and its central portion has an inner diameter $D_2$.

The inner diameter $D_2$ of the central portion of the outer tube (3) is greater than the outer diameter $D_1$ of the inner tube (2).

In particular, the ends (3.1, 3.2) of the outer tube (3) have an inner diameter $D_1$ which, starting from a value equal to diameter $D_2$ of the central segment, gradually decreases until reaching the narrowest part thereof with an inner diameter $D_e$. Furthermore, the inner diameter $D_e$ is smaller than the inner diameter $D_2$ and the inner diameter $D_e$ substantially coincides with the outer diameter $D_1$, such that a substantially airtight chamber (5) is formed between the outer tube (3) and the inner tube (2).

In a preferred example, the thickness of the outer tube (3) is greater than the thickness of the inner tube (2).

Furthermore, the substantially airtight chamber (5) has a volume $V_c$ and a length $L_c$, and the ratio between the volume $V_c$ and the length $L_c$ is preferably less than 3.5 L/m.

In another preferred example, the inner tube (2) has an area $A_i$ and the ratio between the volume $V_c$ of the substantially airtight chamber (5) and the area $A_i$ of the inner tube (2) is less than 15 L/m$^2$.

Figure 3:
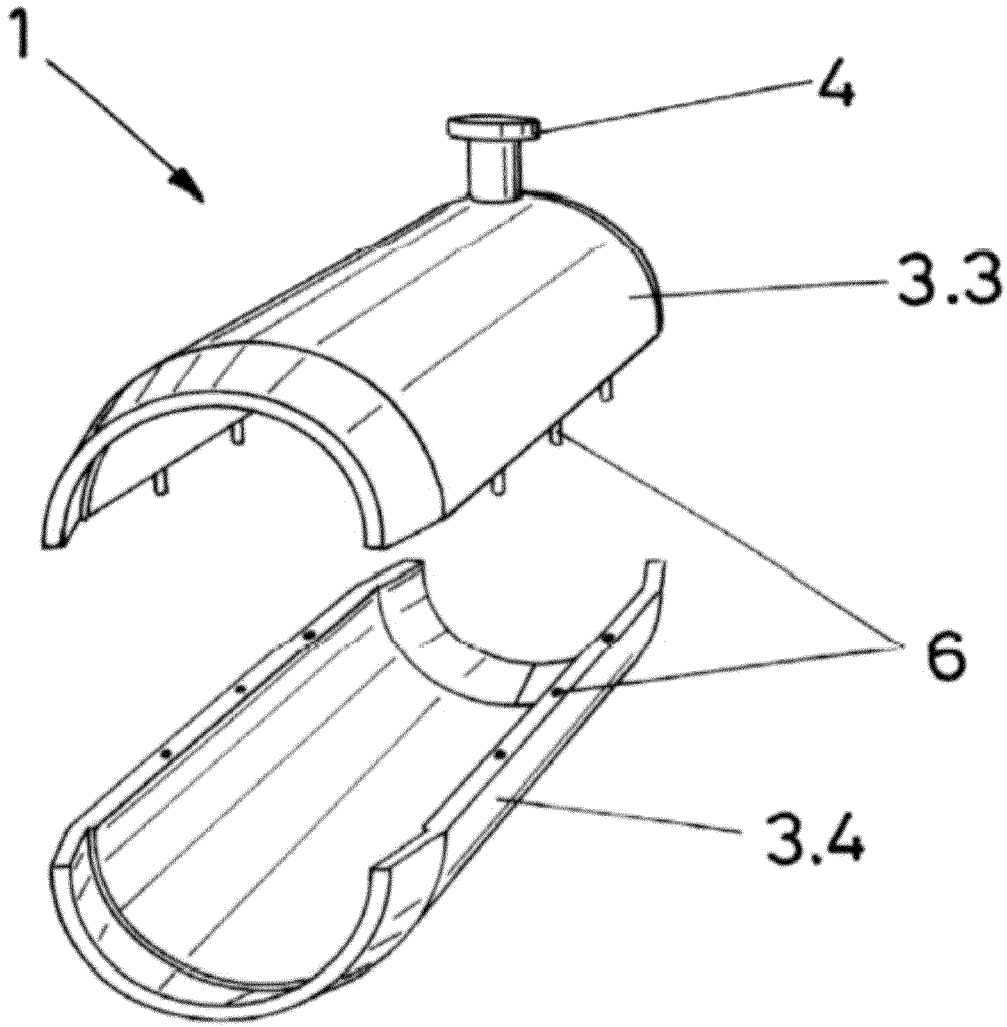
FIG. 3 shows an exploded perspective view of a second embodiment of the device for monitoring the conditions of a thermal fluid.

FIG. 3 shows a second embodiment of the device (1) for monitoring the conditions of a thermal fluid, wherein the outer tube (3) comprises a first independent section (3.3) and a second independent section (3.4).

In this preferred embodiment, the device (1) comprises two independent sections (3.3, 3.4), wherein the outer tube (3) is horizontally sectioned into two substantially equal parts. Preferably, the first section (3.3) and the second section (3.4) are two semi-cylindrical sections.

Furthermore, the first section (3.3) and the second section (3.4) have fixing means (6) allowing said two sections (3.3, 3.4) to be assembled and form a single tube, i.e., the outer tube (3), once the two sections are attached to one another.

Preferably, the two sections (3.3, 3.4) are attached by welding after the installation of said sections (3.3, 3.4) on an existing tube, with the existing tube therefore acting as the inner tube (not depicted) of the device (1). Additionally, the ends of the device (1) are welded to the inner tube.

In a preferred example, the first section (3.3) has connection means (4) in addition to the fixing means (6). The fixing means (6) of the first section (3.3) are preferably projections distributed along the sectioned parts thereof. Similarly, the second section (3.4) comprises complementary fixing means (6), preferably holes distributed in the sectioned parts thereof which are aligned with the projections of the first section (3.3). The attachment of the first section (3.3) with the second section (3.4) therefore takes place by means of the insertion of the projections of the first section (3.3) into the holes provided to that end in the second section (3.4).

Once the first section (3.3) and the second section (3.4) are attached to one another and the device (1) is installed on an existing tube, a substantially airtight chamber (not depicted in the figure), which has all the features of the substantially airtight chamber of the first embodiment of FIGS. 1 and 2, is formed.

Monitoring System

Figure 4:
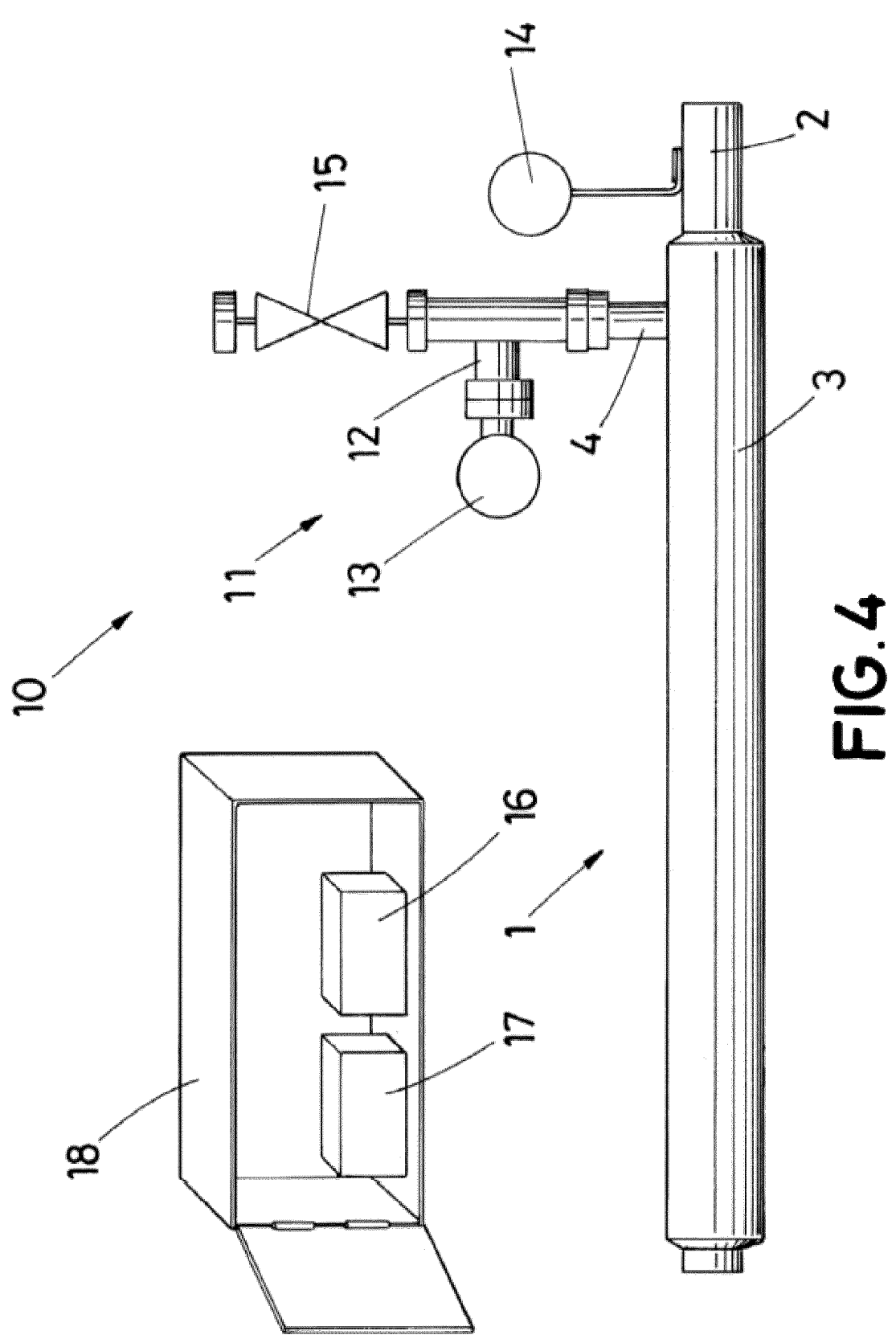
FIG. 4 shows an embodiment of the system for monitoring the conditions of a thermal fluid.

FIG. 4 shows an embodiment of the system (10) for monitoring the conditions of a thermal fluid, wherein the system comprises the device (1) of the first embodiment (FIG. 1 and FIG. 2) or second embodiment (FIG. 3) described above once the outer tube (3) is installed on and welded to the inner tube (2).

The system (10) further comprises equipment (11) comprising gas distribution means (12), pressure measuring means (13), temperature measuring means (14), opening and closing means (15), information processing means (17), and communication means (16).

In particular, the temperature measuring means (14) allow measuring the temperature of the inner tube (2) in real time.

Furthermore, the gas distribution means (12) are fluidically coupled to the connection means (4) which allow fluidic connection with the substantially airtight chamber (not depicted).

Likewise, the pressure measuring means (13), in fluidic connection with the gas distribution means (12), allow measuring the pressure of the gas, preferably hydrogen, present in the sample of the substantially airtight chamber, allowing the pressure of the substantially airtight chamber (not depicted) to be monitored in real time.

Preferably, a pressure measurement is performed as a result of the pressure measuring means (13), with said means being used to calculate pressure inside the substantially airtight chamber (not depicted) in real time in moles of hydrogen.

Furthermore, the equipment (11) of the system (10) comprises opening and closing means (15) which are configured for opening or closing the system (10), and therefore allows resetting all the conditions in the substantially airtight chamber. Once reset, the system (10) can be closed again, and a new vacuum can be generated in the same substantially airtight chamber (not depicted) as a result of an additional vacuum unit.

In particular, the information processing means (17) are configured for controlling the pressure measuring means (13) and the temperature measuring means (14) in real time. Additionally, data relating to pressure variations measured by the pressure measuring means (13) and the temperature measuring means (14) is transmitted through the communication means (16) to additional data processing means which are responsible for predicting the final stagnation value of the substantially airtight chamber (not depicted) through an algorithm.

In a more preferred example, data collection and storage are performed for 3 days, which allows the fine tuning of pressure calculations in moles of hydrogen and final stagnation value predictions.

Additionally, the system has data acquisition means (18) which is responsible for storing the information through the information processing means (17) and the communication means (16).

Solar Power Plant

Figure 5:
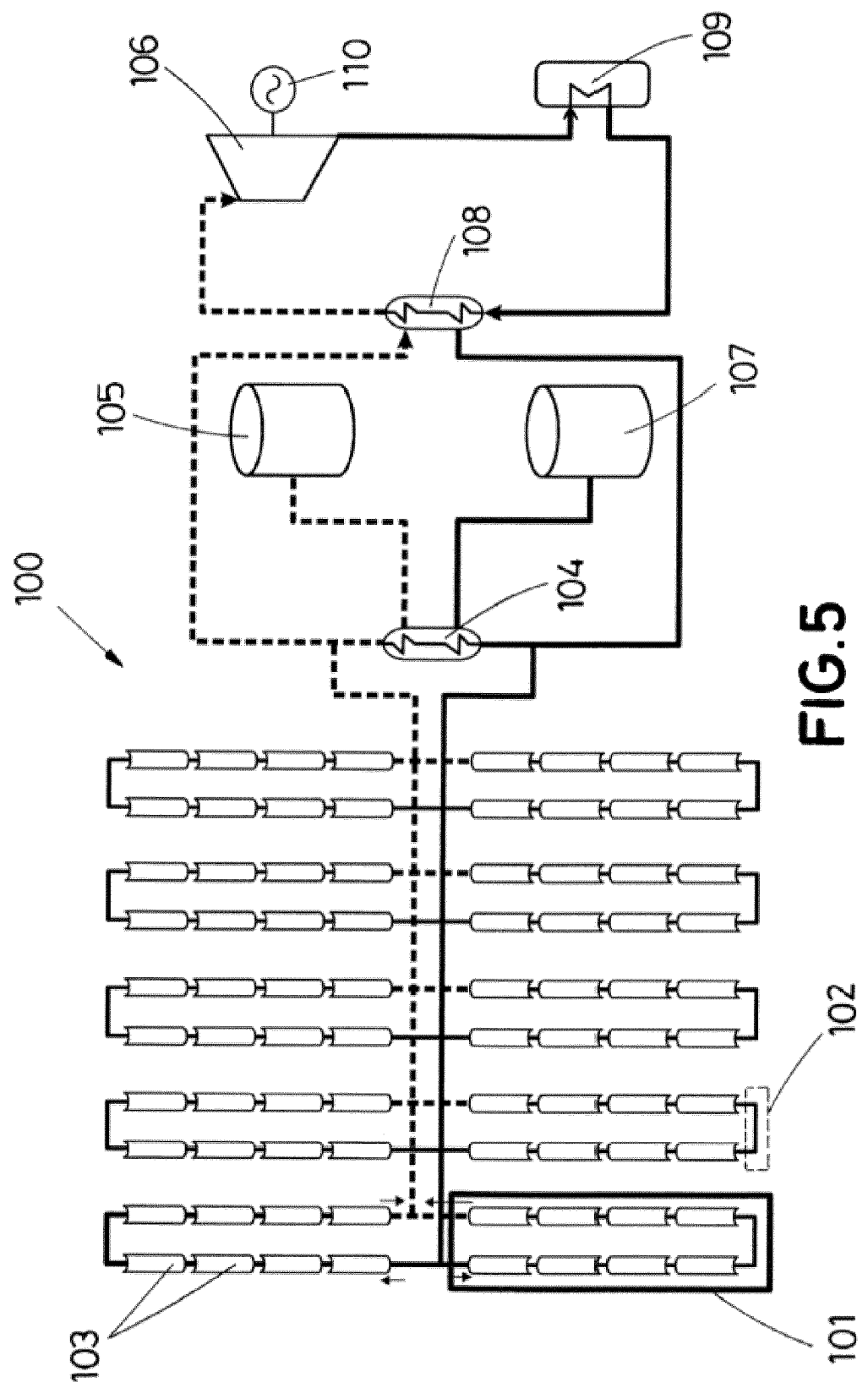
FIG. 5 shows an embodiment of the solar power plant comprising an embodiment of the system for monitoring the conditions of a thermal fluid.

FIG. 5 shows an embodiment of a solar power plant (100) comprising an embodiment of the system (10) for monitoring the conditions of a thermal fluid.

Preferably, the device (not depicted) for monitoring the conditions of a thermal fluid is located in a region without concentrated radiation, that is, a region that does not receive concentrated radiation. Preferably, the thermal fluid is a heat transfer oil or HTF.

The solar power plant (100) has a plurality of loops (101) in which a plurality of solar power collectors (103) is assembled in series. Each of those loops includes a crossover region (102) in which any embodiment of the device (not depicted) of FIG. 1 or 3 is preferably installed since said crossover region (102) is considered a region without concentrated radiation.

The inlet of each loop (101) of the solar power plant (100) is connected to a single tube (solid line) which transports and introduces nominal temperature thermal fluid originating from a common circuit. Moreover, the outlet of each loop (101) of the solar power plant (100) is connected to a single tube (dashed line) which transports and extracts hot, maximum temperature thermal fluid, once it has travelled through the entire loop (101). Said thermal fluid, coming out of each loop (101), is sent to a steam generation circuit through a single tube (dashed line).

The hot thermal fluid is transported through a single tube (dashed line) leading to a steam generation circuit and/or to a storage system. In the first case, said thermal fluid is introduced into an exchanger (108) which heats water through a water-steam cycle and returns the thermal fluid, at a lower temperature, to the previous circuit at the inlets of the plurality of loops (101) of the solar power plant.

Steam is generated in the exchanger (108) to carry out heat transfer between two fluids in a specialized manner, and it allows the water to vaporize before entering a steam turbine (106). The steam turbine (106) converts the potential energy of the steam, generating rotary mechanical energy in a stepwise manner, and it is transmitted directly to a generator (110) which is responsible for converting same into electrical power thereafter.

Once the water leaves the steam turbine (106) again, it is introduced into an exchanger (109) for cooling same until it is back to liquid form and can be reintroduced into the steam generation circuit through the exchanger (108).

In the second case, the heat transfer fluid is introduced into an exchanger (104) which heats molten salts for storing thermal energy. Heat transfer between two fluids is performed in a specialized manner in the exchanger (104).

In the phase of storing the thermal energy from the solar field, the molten salt in the low-temperature tank (107) is heated up and stored in the high-temperature tank (105) again. In the phase of using the stored energy, the hot molten salt in the high-temperature tank (105) is used to heat the thermal oil or heat transfer fluid in the same exchanger (104), and it is then deposited in the low-temperature tank (107) again.

Preferably, the exchangers (104, 108) are large shell and tube exchangers and equipment designed to overheat the steam before it enters the steam turbine (106) is additionally included.

Method for Installing a Device (1) for Monitoring the Conditions of a Thermal Fluid. First Embodiment of the Device.

The device according to the first embodiment can be installed in said crossover region (102) according to the following steps:

(a) providing a device (1) for monitoring the conditions of a thermal fluid according to any of the embodiments, wherein the outer tube (3) is a whole tube, (b) cutting a part of a tube from at least one loop (101) of solar power collectors (103) in a region without concentrated radiation, and (c) welding the two ends (3.1, 3.2) of the outer tube (3) of the device (1) in the part cut from the loop (101) in step (b).

In said first embodiment, a bit of the existing pipe is cut and then the outer tube (3) is welded to the inner tube (2) and the previously cut inner tube (2) is welded to the rest of the existing pipe with the device of FIG. 1 assembled.

Method for Installing a Device (1) for Monitoring the Conditions of a Thermal Fluid. Second Embodiment of the Device.

The device according to the first embodiment can be installed in said crossover region (102) according to the following steps:

(a) providing the first and second sections (3.3, 3.4) of a device (1) for monitoring the conditions of a thermal fluid according to any embodiment of the device of the first inventive aspect, wherein the outer tube (3) comprises two sections (3.3, 3.4), (b) welding the first section (3.3) and the second section (3.4) of the outer tube (3) of the device (1) provided in step (a) in a region without concentrated radiation on an existing tube of at least one loop of solar power collectors (103).

In said second embodiment, the device (1) of FIG. 3 can be installed by positioning the two sections (3.4, 3.5) of the device (1) around the existing tube (2) in the crossover region (102) without cutting or altering said existing tube (2). Subsequently, the two sections (3.3, 3.4) are welded to one another and the ends (3.1, 3.2) of the outer tube (3) are welded to the inner tube (2) in order to form the substantially airtight chamber (5).

The invention claimed is:

1. A device for monitoring the conditions of a thermal fluid, comprising:

an inner tube with a length $L_1$ and an outer diameter $D_1$, and an outer tube with a length $L_2$, wherein the outer tube comprises a central portion with an inner diameter $D_2$ and ends the inner diameter $D_1$ of which gradually decreases towards the narrowest part thereof having a diameter $D_e$, wherein the inner diameter $D_e$ is smaller than the inner diameter $D_2$, wherein the inner tube is arranged coaxially inside the outer tube, the length $L_1$ of the inner tube is greater than the length $L_2$ of the outer tube, and the inner diameter $D_e$ substantially coincides with the outer diameter $D_1$, such that a substantially airtight chamber is formed between the outer tube and the inner tube, wherein the device comprises connection means located on the outside of the outer tube, the connection means being configured for establishing a fluidic communication with the substantially airtight chamber and for coupling a vacuum pump, wherein the inner tube is configured for transporting the thermal fluid, and the outer tube is made of metal, and wherein the outer tube has a hydrogen permeability coefficient less than the permeability coefficient of the inner tube.

2. The device for monitoring the conditions of a thermal fluid according to the preceding claim 1, wherein the substantially airtight chamber has a volume $V_c$ and a length $L_c$, and the ratio between the volume $V_c$ and the length $L_c$ is less than 3.5 L/m.

3. The device for monitoring the conditions of a thermal fluid according to claim 1, wherein the inner tube has an area $A_i$ and the ratio between the volume $V_c$ of the substantially airtight chamber and the area $A_i$ of the inner tube is less than 15 L/m$^2$.

4. The device for monitoring the conditions of a thermal fluid according to claim 1, wherein the thickness of the outer tube is greater than the thickness of the inner tube.

5. The device for monitoring the conditions of a thermal fluid according to claim 1, wherein the outer tube is made of steel.

6. The device for monitoring the conditions of a thermal fluid according to claim 5, wherein the outer tube is made of austenitic stainless steel.

7. The device for monitoring the conditions of a thermal fluid according to claim 1, wherein the ends are tapered.

8. The device for monitoring the conditions of a thermal fluid according to claim 1, wherein the outer tube comprises a coating to reduce the passage of hydrogen out of the substantially airtight chamber.

9. The device for monitoring the conditions of a thermal fluid according to claim 1, wherein the outer tube comprises a first independent section and a second independent section.

10. The device for monitoring the conditions of a thermal fluid according to claim 9, wherein the first independent section and the second independent section of the outer tube are welded to one another and to the inner tube, thereby forming the substantially airtight chamber.

11. The device for monitoring the conditions of a thermal fluid according to claim 9, wherein the first independent section and the second independent section of the outer tube comprise fixing means for forming the substantially airtight chamber.

12. A system for monitoring the conditions of a thermal fluid, comprising:

a device for monitoring the conditions of a thermal fluid according to claim 1, and equipment comprising:

gas distribution means fluidically coupled to the connection means, pressure measuring means-fluidically coupled to the gas distribution means, temperature measuring means connected to the inner tube, opening and closing means-fluidically coupled to the gas distribution means, and information processing means, and communication means, wherein the pressure measuring means are configured for measuring the pressure inside the substantially airtight chamber, the temperature measuring means are configured for measuring the temperature of the inner tube, the opening and closing means are configured for opening or closing the system, the gas distribution means are configured for transporting the gas contained in the substantially airtight chamber to the pressure measuring means and the opening and closing means, the information processing means are configured for controlling the pressure measuring means and the temperature measuring means, and the communication means are configured for receiving information from the pressure measuring means and the temperature measuring means, as well as for transmitting same.

13. The system for monitoring the conditions of a thermal fluid according to claim 12, comprising a vacuum pump configured for generating a vacuum inside the substantially airtight chamber.

14. The system for monitoring the conditions of a thermal fluid according to claim 12, wherein the device is configured for being installed in at least one segment of a solar power plant.

15. A solar power plant comprising a system for monitoring the conditions of a thermal fluid according to claim 12, wherein the system is located in at least one loop of solar power collectors.

16. The solar power plant according to claim 15, wherein the device for monitoring the conditions of a thermal fluid is located in a region without concentrated radiation.

17. The solar power plant according to claim 15, wherein the device is located in the crossover region of the at least one loop of solar power collectors.

18. A method for installing a device for monitoring the conditions of a thermal fluid, characterized in that it comprises the steps of:

(a) providing the first independent section and the second independent section of the outer tube of the device for monitoring the conditions of a thermal fluid according to claim 9, (b) welding the first independent section and the second independent section of the outer tube of the device provided in step in a region without concentrated radiation on an inner tube of at least one loop of solar power collectors.

19. A method for installing a device for monitoring the conditions of a thermal fluid, characterized in that it comprises the steps of:

(a) providing a device for monitoring the conditions of a thermal fluid according to claim 1, (b) cutting a part of a tube from at least one loop of solar power collectors in a region without concentrated radiation, and (c) welding the two ends of the inner tube of the device in the part cut from the loop in step.

20. The method for installing a device for monitoring the conditions of a thermal fluid according to claim 18, wherein the device is located in the crossover region of at least one loop of solar power collectors.

* * * * *